(12) United States Patent
Rosenberg

(10) Patent No.: US 12,445,339 B2
(45) Date of Patent: Oct. 14, 2025

(54) METHODS AND SYSTEMS FOR DIGITAL REPRESENTATION OF ENCODED COMMUNICATIONS DATA AND SIMPLIFIED EVALUATION OF PRECODING IN SYSTEMS USING PHASE-CYCLICAL PRECODING

(71) Applicant: Wavestream Corporation, San Dimas, CA (US)

(72) Inventor: James Jordan Rosenberg, Monrovia, CA (US)

(73) Assignee: Wavestream Corporation, San Dimas, CA (US)

( * ) Notice: Subject to any disclaimer, the term of this patent is extended or adjusted under 35 U.S.C. 154(b) by 0 days.

(21) Appl. No.: 18/334,321

(22) Filed: Jun. 13, 2023

(65) Prior Publication Data

US 2024/0422049 A1 Dec. 19, 2024

(51) Int. Cl.
*H04L 27/26* (2006.01)
*H04L 5/00* (2006.01)

(52) U.S. Cl.
CPC ........ *H04L 27/2698* (2013.01); *H04L 5/0007* (2013.01)

(58) Field of Classification Search
CPC ............. H04L 27/2636; H04L 27/2698; H04L 5/0007
See application file for complete search history.

(56) References Cited

U.S. PATENT DOCUMENTS

| 8,514,966 B2 | 8/2013 | Wajcer et al. |
| 10,021,674 B2 | 7/2018 | Han et al. |
| 2011/0116566 A1* | 5/2011 | Takahashi ........... H04L 27/2636 375/267 |
| 2014/0308892 A1 | 10/2014 | Lee |

FOREIGN PATENT DOCUMENTS

WO WO 2018/100591 A1 6/2018

\* cited by examiner

*Primary Examiner* — Rahel Guarino
(74) *Attorney, Agent, or Firm* — Finn IP Law, PC; Jeffrey A. Finn

(57) ABSTRACT

The present invention discloses the structure and operation of the "geometric shift transform" that enables the use of symbol alphabet code word representation of a user's binary data stream as the signal transport format from a central unit (modem) of a precoded OFDM system to a remote unit (the RF equipment). The invention simplifies the precoding transform (DFT) calculation, enables secure transmissions, and contemplates layer and resource block mapping operations in the central unit.

6 Claims, 12 Drawing Sheets

--PRIOR ART--

METHODS AND SYSTEMS FOR DIGITAL REPRESENTATION OF ENCODED COMMUNICATIONS DATA AND SIMPLIFIED EVALUATION OF PRECODING IN SYSTEMS USING PHASE-CYCLICAL PRECODING

BACKGROUND OF THE INVENTION

The present invention pertains to the field of digital data communications, including mobile telephony, digital wireless terrestrial communications, digital satellite communications and more. For this discussion, it is helpful to distinguish between the signal format transmitted over-the-air (analog encoding of a digital signal) versus signal representations that are used internal to the transmission system connected to the air interface, i.e., intra-system signal transport. More specifically, the present invention is directed to the latter; intra-system digital interfacing among coders, modulators and RF transmission equipment (e.g., block upconverters) and to the evaluation of pre-coded signals for pre-coded orthogonal frequency-division multiplexing (OFDM) systems.

In conventional digital electronic communication systems, such as digital satellite transmission systems, the signal input to the central unit (CU) of a transmission system (i.e., the information to be wirelessly transmitted to a receiver) is generated by a data source as a binary digital data stream, which will also be referred to herein as the user data stream. This stream of "ones" and "zeros" must be converted to some format that can be effectively transmitted via an electromagnetic signal. This formatting is referred to as "modulation." Modulation traditionally occurred in the CU and converted the binary digital stream into an analog signal that encoded the underlying data bits. This analog signal was typically transmitted to a remote unit (RU), which contained the RF equipment and the transmit antenna. In the case of a digital radio, such as a satellite communication system, this modulated analog signal can be imposed on a carrier wave at some other specified radio transmission frequency.

It would be desirable, however, to be able to transport the modulated signal from the CU to the RU (that is connected to the transmit antenna) as a digital signal. Digital signal transport offers numerous advantages over analog, such as greater noise immunity, greater frequency planning flexibility, improved signal quality, easier signal manipulation and greater security (encryption), to name some.

As will be described in the detailed description of the invention, intra-system digital representations of transmittable signal include symbol alphabet (also referred to as symbol code word) and sampled waveform. In order to minimize the computing power needed in the RU, the most commonly used system partitionings in terrestrial systems (e.g., O-RAN "splits" 7.2 and 7.2X) use a sampled waveform format for transporting the signal between the CU and RU.

Unfortunately, the data rates required for a sampled waveform digital signal transport are very high, up to 10 or more times the bit rate of the user data stream. For example, in LTE systems, a 75 Mbps user data stream requires an intra-system digital bit rate of 1.23 Gbps. Thus, an alternative system approach that can digitally transport an intra-system signal from a CU to an RU both securely and without incurring high data rates or requiring substantial computing power in the RU would be very beneficial.

The present invention addresses these needs and more.

SUMMARY OF THE INVENTION

The present invention meets these needs by enabling in pre-coded OFDM systems the use of symbol alphabet (code word) transmission between the encoder (Central Unit) and the RF equipment (Remote Unit), as well as simplifying the precoding transform calculation. The invention may be implemented in satellite or terrestrial (e.g., O-RAN) systems.

The present invention discloses a novel method for implementing an M-point phase-cyclic transform used for precoding in a pre-coded OFDM system, on a digital signal stream represented as a sequence of M k-bit symbol code words, where each code word represents one of $2^k$ points in a base constellation of points on the complex plane. In one preferred embodiment, the method comprises the steps of generating a geometric shift table of stored values, having $2^k$ rows and M columns, where the table is defined by $$C_{a,n} = \begin{bmatrix} r_{[1]}e^{j\theta_{[1]}}e^{j\varphi_0} & r_{[1]}e^{j\theta_{[1]}}e^{j\varphi_1} & \cdots & r_{[1]}e^{j\theta_{[1]}}e^{j\varphi_{M-1}} \\ r_{[2]}e^{j\theta_{[2]}}e^{j\varphi_0} & r_{[2]}e^{j\theta_{[2]}}e^{j\varphi_1} & \cdots & r_{[2]}e^{j\theta_{[2]}}e^{j\varphi_{M-1}} \\ \vdots & \vdots & \ddots & \vdots \\ r_{[2^k]}e^{j\theta_{[2^k]}}e^{j\varphi_0} & r_{[2^k]}e^{j\theta_{[2^k]}}e^{j\varphi_1} & \cdots & r_{[2^k]}e^{j\theta_{[2^k]}}e^{j\varphi_{M-1}} \end{bmatrix}$$

wherein each column is referenced by an index, n, and each of row is referenced by one of the $2^k$ k-bit code words, with n ranging from 0 for the first column to n=M−1 for the $M^{th}$ column, and the $\varphi_m$ exponents represent the phase factors characteristic of the particular phase-cyclic transform to be applied. The entries in the first column of the table contain the complex numeric values from $r_{[1]}e^{j\theta_{[1]}}$ to $r_{[2^k]}e^{j\theta_{[2^k]}}$ corresponding to each point in the base constellation, ordered by the corresponding code word, and each subsequent column contains entries equaling the complex numeric value of each point in the base constellation multiplied by the corresponding phase factors, $\varphi_n$, that characterize said phase-cyclic transform, with each row entry ordered by the corresponding code word; mapping each of the M symbol code words within said sequence of M code words to an index, m, with m ranging from 0 to M−1; forming a set of M outputs, referenced by an index, l, with l ranging from 0 to M−1; and evaluating each of the M outputs of the transform as the sum of M table entries, each entry selected from the $n^{th}$ column of the table where n is evaluated as the product of l and m, modulo M, and from the row corresponding to the code word assigned to the $m^{th}$ index, m ranging from 0 to M−1.

In preferred embodiments, the phase-cyclic transform is a Discrete Fourier Transform (DFT), and the phase factors, $\varphi_n$, are −2πn/M. The method of the present invention may further comprise the steps of performing a Layer Mapping operation and a Resource Block Mapping operation on the signal code word stream at a first location, and the forming and evaluating steps, called Geometric Shift Precoding, are performed at a location remote from the first location. This novel transform may preferably be implemented in a wireless transmission system, wherein the Layer Mapping and Resource Block Mapping operations are performed in a modem at the first location and the Geometric Shift Precoding and preparation of the signal for transmission via an air interface are performed at the remote location.

In other embodiments, a method for transporting a digital signal stream within a pre-coded OFDM transmission system is disclosed. The steps for this embodiment include encoding in a modem the signal stream as a sequence of M k-bit symbol code words, where each code word represents one of $2^k$ points in a base constellation of points on the complex plane, and transporting from the modem the symbol code word stream to a remote unit. In such embodiment, at the remote unit, the symbol code word stream is input into an M-point phase-cyclic precoding transform, which is implemented by i.) generating a geometric shift table of stored values, having $2^k$ rows and M columns, the table defined by $$C_{a,n} = \begin{bmatrix} r_{[1]}e^{j\theta_{[1]}}e^{j\varphi_0} & r_{[1]}e^{j\theta_{[1]}}e^{j\varphi_1} & \cdots & r_{[1]}e^{j\theta_{[1]}}e^{j\varphi_{M-1}} \\ r_{[2]}e^{j\theta_{[2]}}e^{j\varphi_0} & r_{[2]}e^{j\theta_{[2]}}e^{j\varphi_1} & \cdots & r_{[2]}e^{j\theta_{[2]}}e^{j\varphi_{M-1}} \\ \vdots & \vdots & \ddots & \vdots \\ r_{[2^k]}e^{j\theta_{[2^k]}}e^{j\varphi_0} & r_{[2^k]}e^{j\theta_{[2^k]}}e^{j\varphi_1} & \cdots & r_{[2^k]}e^{j\theta_{[2^k]}}e^{j\varphi_{M-1}} \end{bmatrix}$$

wherein each column is referenced by an index, n, and each of row is referenced by one of the $2^k$ k-bit code words, with n ranging from 0 for the first column to n=M−1 for the $M^{th}$ column, and the $\varphi_m$ exponents represent the phase factors characteristic of the particular phase-cyclic transform to be applied, and wherein entries in the first column contain the complex numeric values from $r_{[1]}e^{j\theta_{[1]}}$ to $r_{[2^k]}e^{j\theta_{[2^k]}}$ corresponding to each point in the base constellation, ordered by the corresponding code word, and each subsequent column containing entries equaling the complex numeric value of each point in the base constellation multiplied by the corresponding phase factors, $\varphi_n$, that characterize said phase-cyclic transform, with each row entry ordered by the corresponding code word; ii.) mapping each of the M symbol code words within said sequence of M code words to an index, m, with m ranging from 0 to M−1; iii.) forming a set of M outputs, referenced by an index, l, with l ranging from 0 to M−1; and iv.) evaluating each of said M outputs of the transform as the sum of M table entries, each said entry selected from the $n^{th}$ column of the table where n is evaluated as the product of l and m, modulo M, and from the row corresponding to the code word assigned to the $m^{th}$ index, m ranging from 0 to M−1.

In yet other embodiments, a non-transitory computer-readable storage medium storing one or more computer-readable programs which, when executed on a processor, configure the processor to carry out a method for computationally performing an M-point phase-cyclic transform used for precoding in a pre-coded OFDM system is disclosed. This transform, which may be a DFT, is performed on a digital signal stream represented as a sequence of M k-bit symbol code words, each code word representing one of $2^k$ points in a base constellation of points on the complex plane. The method carried out by the processor may comprise the steps of a.) generating a geometric shift table of stored values, having $2^k$ rows and M columns, the table defined by $$C_{a,n} = \begin{bmatrix} r_{[1]}e^{j\theta_{[1]}}e^{j\varphi_0} & r_{[1]}e^{j\theta_{[1]}}e^{j\varphi_1} & \cdots & r_{[1]}e^{j\theta_{[1]}}e^{j\varphi_{M-1}} \\ r_{[2]}e^{j\theta_{[2]}}e^{j\varphi_0} & r_{[2]}e^{j\theta_{[2]}}e^{j\varphi_1} & \cdots & r_{[2]}e^{j\theta_{[2]}}e^{j\varphi_{M-1}} \\ \vdots & \vdots & \ddots & \vdots \\ r_{[2^k]}e^{j\theta_{[2^k]}}e^{j\varphi_0} & r_{[2^k]}e^{j\theta_{[2^k]}}e^{j\varphi_1} & \cdots & r_{[2^k]}e^{j\theta_{[2^k]}}e^{j\varphi_{M-1}} \end{bmatrix}$$

wherein each column is referenced by an index, n, and each of row is referenced by one of the $2^k$ k-bit code words, with n ranging from 0 for the first column to n=M−1 for the $M^{th}$ column, and the $\varphi_m$ exponents represent the phase factors characteristic of the particular phase-cyclic transform to be applied, and wherein entries in the first column contain the complex numeric values from $r_{[1]}e^{j\theta_{[1]}}$ to $r_{[2^k]}e^{j\theta_{[2^k]}}$ corresponding to each point in the base constellation, ordered by the corresponding code word, and each subsequent column containing entries equaling the complex numeric value of each point in the base constellation multiplied by the corresponding phase factors, $\varphi_n$, that characterize said phase-cyclic transform, with each row entry ordered by the corresponding code word; b.) mapping each of the M symbol code words within said sequence of M code words to an index, m, with m ranging from 0 to M−1; c.) forming a set of M outputs, referenced by an index, l, with l ranging from 0 to M−1; and d.) evaluating each of said M outputs of the transform as the sum of M table entries, each said entry selected from the $n^{th}$ column of the table where n is evaluated as the product of l and m, modulo M, and from the row corresponding to the code word assigned to the $m^{th}$ index, m ranging from 0 to M−1.

It is to be understood that the invention is not limited in its application to the details of construction and the arrangement of components described hereinafter and illustrated in the drawings and photographs. Those skilled in the art will recognize that various modifications can be made without departing from the scope of the invention.

BRIEF DESCRIPTION OF THE FIGURES

Further advantages of the present invention may become apparent to those skilled in the art with the benefit of the following detailed description of the preferred embodiments and upon reference to the accompanying drawings in which.

DETAILED DESCRIPTION OF THE INVENTION

Figure 1:
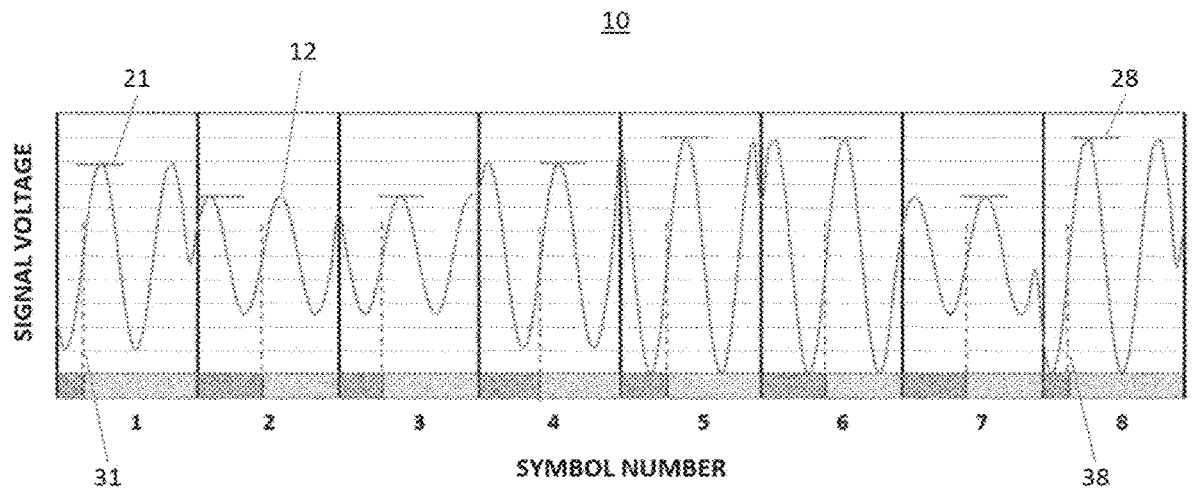
FIG. 1. is a representative conventional time-domain voltage waveform plot for a representative digital radio signal, partitioned into symbol periods, in which a digital number is encoded on the amplitude and phase of a sine wave segment.

As discussed above, in traditional digital radio systems, the signal modulation function is carried out by the transmit portion of a modem located at a central unit (CU) of a transmission system, and the imposition of this modulated signal onto a radio frequency carrier (as well as subsequent amplification) is carried out by RF equipment (e.g., a block upconverter, or BUC) located at a remote unit (RU). In such traditional systems, the signal is transported from the CU to the RU as an analog signal. In modern terrestrial wireless systems, the signal is generally transported between the CU and RU in a digital format.

The present invention improves pre-coded OFDM systems, such as systems using DFT-s-OFDMA or SCFDMA that use a phase-cyclic precoding transform (e.g., Discrete Fourier Transform, Discrete Hartley Transform, or phase-modifying Linear Canonical transforms, generally). The invention disclosed herein permits a significant reduction in the data rate required for digital communication between the CU and RU (up to a factor of ten relative to a complex numeric IQ symbol representation of the pre-coded signal, depending on waveform details), and a significant reduction in computational load for evaluation of the precoding, while simultaneously permitting critical frequency and time allocation functionality (Resource Element Mapping) or scrambling functionality (for signal obfuscation) to be partitioned into the CU.

Referring now to the drawings, like reference numerals designate identical or corresponding features throughout the several views.

A review of conventional digital radio transmission is now briefly provided. Conventionally, the transmission consists of a sequence of time blocks, referred to as symbol periods, during which the transmission is a segment of a sine wave for which the amplitude and phase are set to one of a pair of predetermined values. FIG. 1 shows a representative time-domain versus voltage plot 10 for such a representative digital radio signal, which modulates both the amplitude and the phase of the signal simultaneously ("quadrature-amplitude modulation," or QAM, and 'amplitude and phase shift keying," or APSK). In this way, the amplitude and phase both encode information in digital bits to be transmitted by each symbol. As seen in this example, the transmit time domain voltage waveform 12 is broken up into symbol periods eight (8) of which are illustrated in FIG. 1. The sine wave segment in each symbol period 1-8 shown in this figure has a discrete signal voltage amplitude, indicated by a horizontal bar and a discrete phase indicated by a vertical dotted line. Thus, symbol period 1 of waveform 12 has voltage amplitude designated at line 21 and phase designated at line 31, while the signal at symbol period 8 has an amplitude designated at 28 and phase at line 38.

The predetermined amplitude and phase pairs in each symbol can be represented as a collection of points on the complex in-phase/quadrature (IQ) plane. One such collection of predetermined points is referred to as a quadrature amplitude modulation, or QAM, constellation, in which the points are substantially evenly spaced on a square grid. This representation is often designated as xQAM, where x is the number of points in the complex plane corresponding to the predetermined amplitude and phase pairs. Any such collection of points in the complex plane can, in principle, comprise a constellation, but it is most common that the number of points is some power of two, $2^k$, where k is the number of bits in a "code word", such that there can be a one-to-one mapping from a k-bit binary "code word" to individual points in the constellation. Such a mapping is referred to as the "alphabet" for the constellation. Thus, for example, for k=4 representing a 4-bit binary code word, a $2^4$QAM, or 16QAM constellation is obtained.

A commonly used alternative constellation structure to QAM is APSK. In this construction, constellation points are arranged in substantially circular concentric rings around the origin of the complex IQ plane. Even though APSK constellations are not square, they are typically constructed using $2^k$ points so that a one-to-one mapping between $2^k$ k-bit words and the constellation points may be made.

Figure 2:
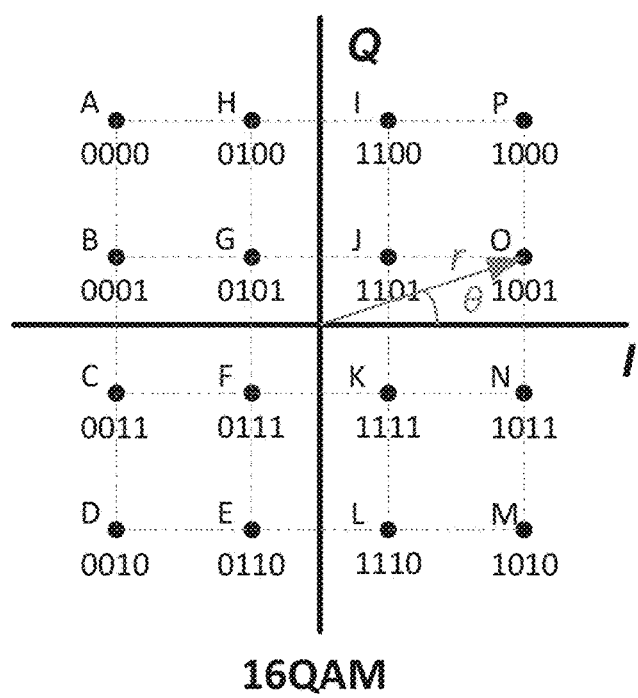
FIG. 2 is an exemplary, conventional two-dimensional diagram of a 16QAM IQ constellation, showing an arbitrary binary coded symbol alphabet assigned to each constellation point.

An exemplary code word assignment and alphabet for a 16QAM constellation is shown in FIG. 2, where each of the 16 points is designated by a code word 0000 through 1111, and one letter of the alphabet from A through P. Thus, as shown in this example, the modulated signal's voltage amplitude r and phase θ for one given symbol period is represented by a point in the constellation, as seen here for code word 1001/alphabet letter O. It is thus understood that the information can be transmitted digitally along the intra-system signal path as a "sampled waveform" (numerical samples of each symbol's sine wave segment voltage versus time) or as a "symbol alphabet" (or "code word")—i.e., as a stream of letters or binary numbers on the constellation each representing a unique amplitude and phase of the sine wave.

Figure 3:
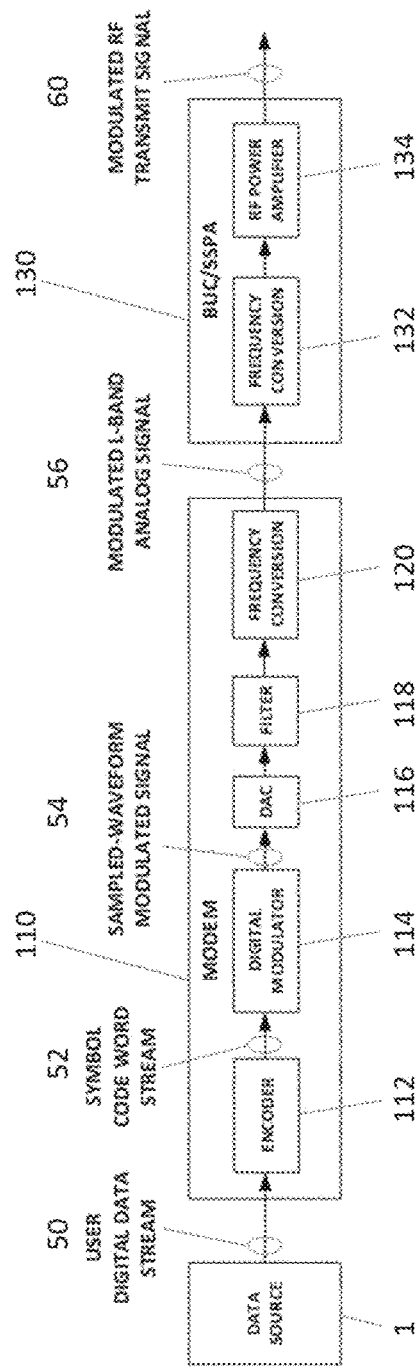
FIG. 3 is a simplified block diagram showing a modern satellite communication signal transmit chain, with traditional partitioning of functions in the modem and BUC.

Turning now to the signal transmission architecture, FIG. 3 is a simplified functional block diagram showing a traditional transmit signal processing configuration 100 commonly used for satellite transmissions. This diagram shows the signal chain as it moves into, through and out of modem 110, and transmitted as an analog signal to the RF equipment, such as a BUC/SSPA 130 for up-conversion, amplification, and transmission over the air interface (via an antenna connected to the BUC not shown). Data source 1 creates digital user data stream 50. Encoder 112 within modem 110 takes the user's digital data stream 50 as an input and adds to it bits for data framing (headers, trailers, and pilot symbols), error correction bits, and encryption. It also segments the resulting encoded stream into k-bit blocks for constellation coding, as discussed above. These k-bit blocks then correspond to a sequence of alphabet characters for the selected constellation, denoted as symbol code word stream 52.

Conventional digital modulator block 114 follows encoder block 112. Modulator 114 converts the stream of symbol code words or alphabet characters 52 into a signal of the form shown in FIG. 1. In a modern modem, this occurs in two steps. First a sampled waveform digital representation 54 of the intended signal is generated. This digital representation of the baseband waveform—usually in/and Q format—is then converted to an analog signal by digital-to-analog converter DAC 116. It is thus seen that in this data path, there are two different digital signals in the modem, a digital symbol code word representation 52 and a digital waveform representation 54: each containing the same information, but having different character, and providing different advantages and disadvantages as the basis for the transport of the information. The output of DAC 116 is then filtered at filter 118 and passed to RF equipment RU 130 via a frequency converter 120 as an analog signal having an intermediate carrier frequency, commonly as seen here in the L-band.

However, as discussed above, there are advantages to transporting the signal from the modem to the RF equipment in a digital format. A digital signal has reduced susceptibility to interference and degradation. Providing the signal to the RF equipment as a digital signal also simplifies the use of digital signal processing to mitigate RF equipment signal impairments (non-flat frequency response, non-linear distortion). Additionally, and significantly for some applications, using a digital representation enables the use of remote, virtualized modems.

One simple implementation of a digital transport would be to use the sampled-waveform output 54 of the digital modulator 114 as the digital transport format. This is a simple approach but has the disadvantage that this sampled-waveform digital representation 54 can require ten or more times the data rate of the underlying user digital data stream 50.

Alternatively, transmitting a symbol alphabet (code word) stream 52 from the encoder block to a modulator that is located in radio unit 130 (at the antenna) would be desirable because it requires a data rate only slightly larger than the underlying user data rate. The drawback to this approach, however, is that this configuration requires that the RF equipment contain the modulator that generates the time-domain waveform. Thus, the modulator must "know" all the constellations the modem will use. Such a modulator may be proprietary to a particular waveform carrying sensitive information.

For an arbitrary set of constellations, the required modulator may thus be a proprietary custom-designed piece of hardware. However, for an OFDM modulation system this is not so because the time-domain waveform is generated by an inverse Fourier transform block, typically implemented as an IFFT. (The only information needed to build such an IFTT modulator in, for example, an ASIC or a fast field programmable gate array (FPGA), is the number of subcarriers and the bit depth). This makes simple (non-precoded) OFDM systems particularly well suited for the application of code word transport to the RF equipment. The RF equipment could then translate the symbol code words into complex number inputs to the IFFT modulator using a simple lookup table. Unfortunately, however, simple OFDM waveforms suffer from very high Peak to Average Power Ratios (PAPR)—a measure of the maximum instantaneous power of a signal compared to its average power. High PAPR is undesirable in communication systems because it requires amplifiers having peak power capacity much larger than the average transmission power, resulting in increased cost and increased power consumption.

OFDM systems employing phase-cyclic precoding, such as discrete Fourier transform spread orthogonal frequency division multiple access (DFT-s-OFDMA), aka single-carrier FDMA (SC-FDMA), address this high PAPR challenge. This approach basically adds a DFT block between the (digital) modulator and the inverse Fourier transform that generates the time domain output. This additional precoding operation does reduce the PAPR, but the additional operation complicates the application of code word signal transport relative to a simple (non-precoded) OFDM configuration, as shown in block diagrams in FIGS. 4 and 5. In this case, each of the inputs to the IFFT block are not individual symbols, but rather the aggregate output of a mathematical transform (DFT) operation taking multiple symbols as inputs for generating each output to the IFFT block.

The output of the precoding transform—and therefore the input to the IFFT block—is the result of a complex mathematical operation on multiple symbol inputs rather than a set of individual symbols. Therefore the inputs to the IFFT modulator are not simple code words, so an initial analysis of this configuration would suggest that a sampled-waveform approach rather than a symbol alphabet representation would be necessary to represent the output of the phase-cyclical transform of the multi-character input to the precoding transform.

However, as now discussed, the present invention enables, in a DFT-s-OFDMA architecture, the use of symbol alphabet (code word) transmission between the encoder and the RF equipment as well as the simplification of the precoding transform calculation.

Twiddle Factors—As further background, in digital signal processing (DSP), a twiddle factor is a complex constant that is used in the computation of the discrete Fourier transform (DFT) and its inverse, the inverse discrete Fourier transform (IDFT). The twiddle factors are represented as complex exponentials, where the argument of the exponential function is a multiple of $2\pi/N$, where N is the number of points in the DFT or IDFT. The twiddle factors are used to perform a "butterfly operation", which is a fundamental building block of the FFT (Fast Fourier Transform) algorithm. The butterfly operation involves the multiplication of two complex numbers and the addition of the result to two other complex numbers, as shown below: $y[k]=\omega_N^{k-1}x[k+N/2]+x[k]$, where y[k] is the output of the butterfly operation, x[k] and x[k+N/2] are the input values, and $\omega_N^{k-1}$ is the twiddle factor with argument $2\pi(k-1)/N$. The use of twiddle factors in the FFT algorithm reduces the number of complex multiplications required for the computation of the DFT, making the algorithm more efficient than the direct computation of the DFT. That said, the FFT still requires complex multiplications, which are computationally intensive.

Recognizing that multiplication by the twiddle phase factors in the precoding transform can be represented as a rotation of constellation points about the origin of the complex plane, the inventor of the present invention has realized that since there is no need to be able to perform a DFT on arbitrary numerical inputs, but rather, only on a specific discrete set of complex numbers corresponding to the constellation points, the computationally intensive multiplication by phase factors can be realized by storing rotated versions of the constellation lookup tables corresponding to each of the required phase factors. The evaluation of the transform can thus be reduced to a set of complex additions of values stored in these "rotated" lookup tables. As will be illustrated below with a specific example, this insight enables the use of symbol alphabet (code word) transport of the information—for reduction of required data rate capacity—and significant reduction in computational load for evaluation of the precoding.

Presented now is a description of a specific example implemented using the traditional application of the DFT followed by a description of how the present invention enables the use of symbol code word signal transport and simplifies the evaluation of the DFT.

Figure 4:
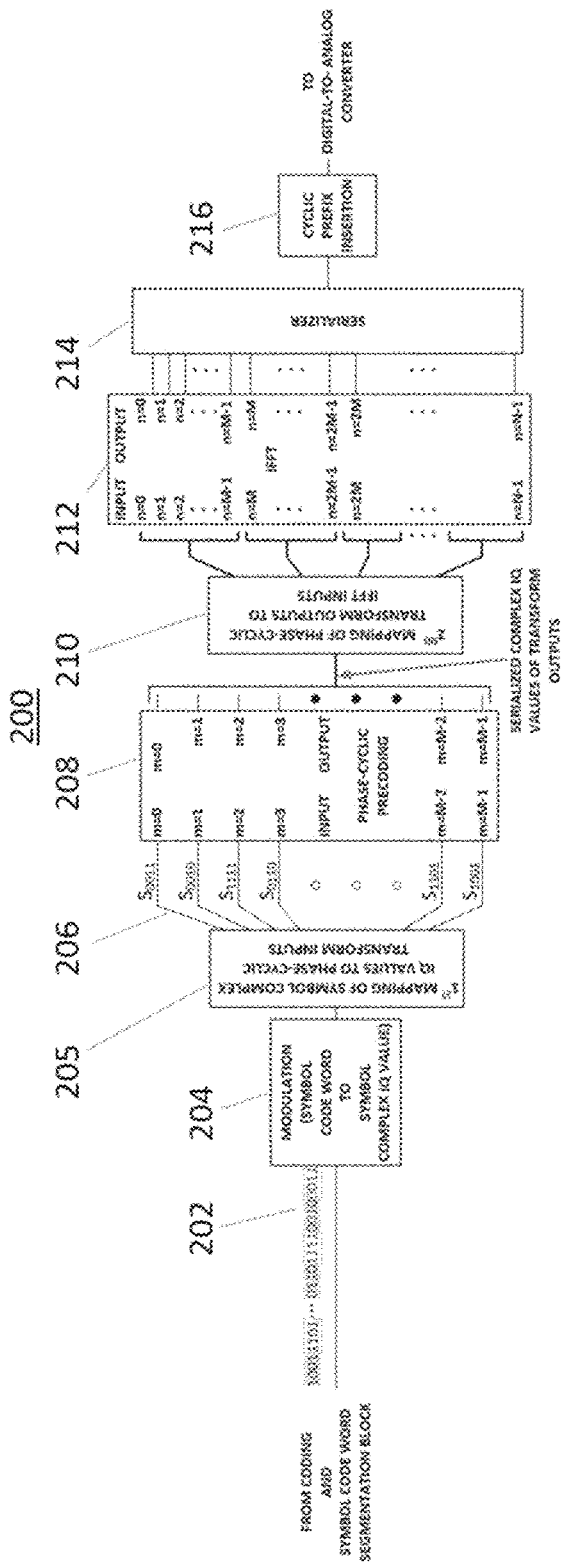
FIG. 4 is a simplified block diagram of a portion of the transmit path of a conventional OFDM communications system using phase-cyclic precoding, such as a discrete Fourier transform.

The most straightforward implementation of the traditional version of this type of OFDM system is shown in FIG. 4. FIG. 4 is a simplified diagram 200 of a portion of the transmit path of a 16QAM phase cyclic precoding OFDM modem. Modulator 204 ingests an encoded 4 bits per symbol string 202 to modulate the symbol code word to symbol complex IQ values. The number of points in IFFT modulator 212 (which is equal to the raw number of OFDM subcarriers) is "N", and the number of points in the precoding FFT transform 208 is "M". For specificity, this example treats the case in which M=8 and N=256. As seen, there are two mappings shown in this block diagram, the first 205 maps the symbol IQ representations (output of modulation block 204) onto the inputs of the phase-cyclic precoding block 208, and the second 210 maps the output of phase-cyclic transform 208 to the input of IFFT block 212. The input of the second mapping 210 is the serialized complex IQ output of the precoding transform 208.

For the configuration described above, the encoded binary bit stream 202 is segmented into 32-bit blocks, further subdivided into eight four-bit alphabet characters (for the four bit per symbol 16QAM constellation being used). The eight four-bit sub-blocks—each of which corresponds to a point in the constellation and the corresponding complex number—are sequentially indexed zero through seven. The amplitudes, $r_m$, and the phases, $\theta_m$, of the eight symbols represented by the alphabet characters contained in the sub-blocks m=0 to 7 are the inputs to a discrete Fourier transform (DFT) defined by:

$$X_l = \sum_{m=0}^{M-1} r_m e^{j\theta_m} e^{-j2\pi l \frac{m}{M}} \quad (1)$$

where j is the imaginary unit, the eight $X_l$ are the eight outputs (indexed 0 to 7) of the 8-point discrete Fourier transform, and m is the index of the symbol in the M-word input block. In this most straightforward mapping of the encoded binary input 206 to the Fourier transform precoding 208, the blocks would be sequentially input into the DFT. That is, the $0^{th}$ sub-block would be multiplied by a phase factor zero radians, and $1^{st}$ sub-block (m=1) would be multiplied by a phase factor of $$-2\pi l \times \frac{m}{M} = \frac{l\pi}{4},$$

the $2^{nd}$ sub-block (m=2) is multiplied by $$-2\pi l \times \frac{m}{M} = \frac{l\pi}{2},$$

and so on, where l represents the index of the Fourier transform output, ranging from 0 to 7.

In the straightforward configuration, mapping of the Fourier transform 208 outputs to the IFFT 212 inputs would be a simple sequential mapping of the DFT outputs to the IFFT inputs, where the $1^{th}$ output of FFT 208 is applied to the l+pM input of the IFFT 212, where l is the index of the DFT output, and p is the index of the sets of (N/M)-bit input blocks. The input of each point in IFFT 212 is given by the sum of the complex numbers represented by each symbol alphabet character, called out by each of the eight sub-blocks, each multiplied by the corresponding phase "twiddle factor".

Note that the most straightforward sequential mappings used in the foregoing example is one of an extremely large number of possible mapping permutations. In general, this mapping is an integral part of the subcarrier assignment and bandwidth management function of the modem. In O-RAN terminology, the first and second mappings 205, 210 are referred to as "Layer Mapping" and "Resource Element Mapping", respectively, and these mappings control where in the time-frequency resource grid each user's data will be transmitted. Therefore, it would be best if the system partitioning leaves this mapping functionality in the modem or CU. Further, the details of this mapping may be proprietary intellectual property of the modem manufacturer, and as such, the modem manufacturer may wish to keep the details of the subcarrier mapping "hidden" from the RF equipment manufacturer, which also makes it advantageous to partition the system such that the subcarrier mapping functionality is in the modem.

Figure 5:
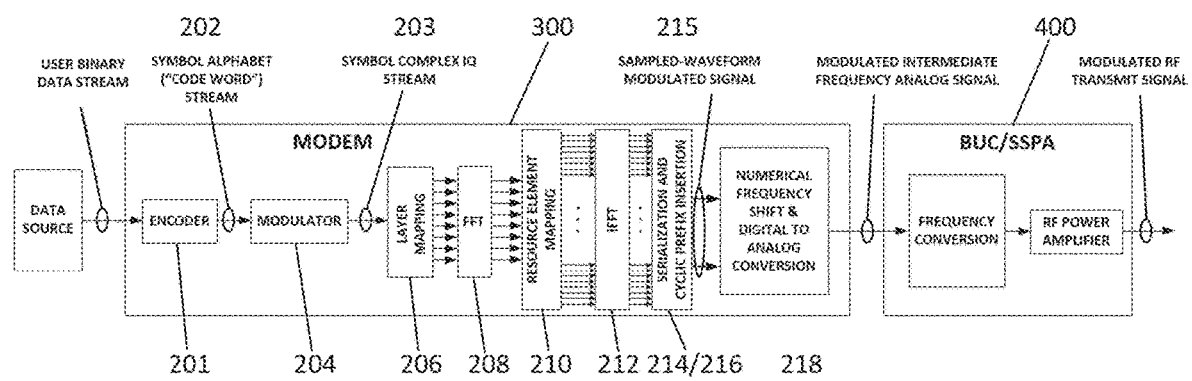
FIG. 5 is simplified block diagram showing a conventional implementation of a DFT-s-OFDMA system, with signal formats along the signal chain illustrated.

A more generalized of version of a traditional implementation of a DFT-s-OFDMA system, with potentially arbitrary mappings is shown in FIG. 5. Here, the data rate at the sampled-waveform format 203 can be ten or more times larger than the data rate at the symbol alphabet ("code word") format 202. Note that the mapping can also be used to disguise the underlying data. If the first and second mappings are not known by a party that is attempting to intercept the signal, properly decoding the signal would be nearly impossible, given the huge number of possible permutations even for modest values of M and N. For example, using the example in FIG. 4 with M=8 and N=256 would lead to over $10^{40}$ permutations.

While a fast Fourier transform (FFT) implementation of the DFT can be computationally efficient, it still involves a significant number of complex-valued multiplications. By contrast, the present invention takes advantage of the fact that the DFT implementation required in this application need not have the capability of taking any arbitrary complex number as input to the phase-cyclic, pre-coding transform (PCPT), but rather only those complex numbers that represent points in the IQ constellation we are using. That is, the $r_m$ and the $\theta_m$ of equation (1) cannot be arbitrary values, but rather can only be specific pairs of values, $(r_\alpha, \theta_\alpha)$, selected from the $2^k$ constellation points. In the specific exemplar case discussed above, the index, $\alpha$, would range from A to P.

Figure 6:
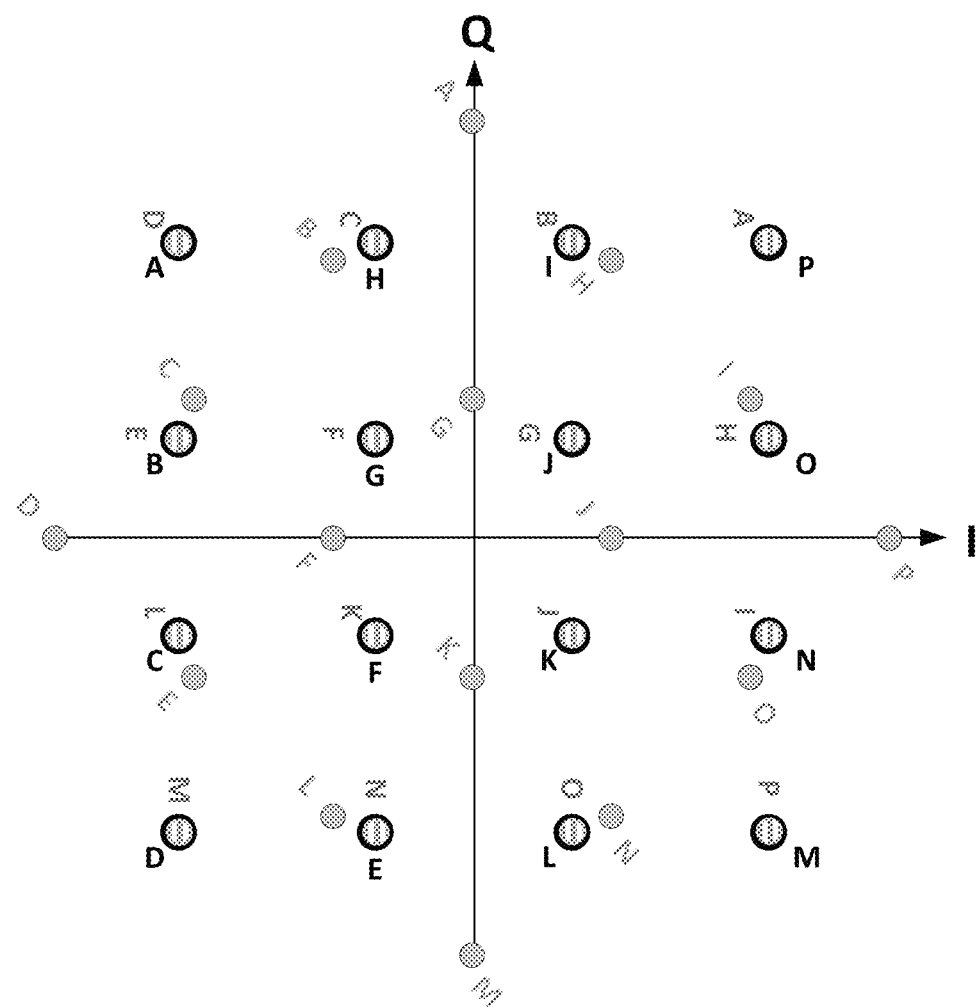
FIG. 6 shows an exemplary 16QAM constellation illustrated with selected constellation point/alphabet rotations according to the present invention.

Next, the inventor of the present invention recognized that the multiplication of points in the complex plane corresponding to the constellation by a unity-magnitude phase factor, as is required in a PCPT (e.g., DFT) calculation, can be geometrically represented by rotation of the constellation points about the origin of the complex plane by the corresponding phase angle. Therefore, evaluating the input to each input point on the IFFT block (corresponding to an output of the DFT) can be reduced to evaluating the complex sum of the eight points represented by the alphabet characters in each of the eight sub-blocks in the corresponding rotated constellation—that is to say, no complex multiplications are performed in the computation. Thus, for this example there would be a total of 8 constellation rotations. A 16QAM constellation map, showing the original state and first two of these rotations along with the rotated alphabet assignments, is illustrated in FIG. 6. As seen, the black circles represent zero rotation—the original state of the constellation. The solid gray points represent π/4 (45 degree) rotation, and the striped points represent π/2 (90 degree) rotation. Rotated alphabets are also shown. Thus, the rotated assignments for letter A are shown as follows: the original state of point A is at the top left corner of the 16-point grid. The first 45-degree constellation rotation puts A (now represented as a solid grey point) on the Q-axis at the top. The second rotation puts point A (striped) at the top right corner of the grid, and the third rotation puts point A on the far right of the I-axis. Note that the remaining 5 rotations, namely 3π/4, π, 5π/4, 3π/2, and 7π/4 are omitted for clarity of the diagram.

Performing the Discrete Fourier transform (or alternative PCPT) of the symbol alphabet inputs by simply summing the contents of lookup tables comprising rotated constellation points shall be referred to herein as a "geometric transform." An exemplary lookup table for the 16QAM case of k=4 and M=8 (for an 8-point DFT), is an 8×16 matrix of complex numbers (16 points A-P, each having 8 rotational positions on the constellation) as shown in equation (2), below. Each entry in the table of equation (2) is the product of:

one of the $2^k$ (16) complex numeric values representing a code word (corresponding to alphabet letters A-P) in the unrotated constellation, and A phase factor, $$e^{-j2\pi\frac{n}{M}},$$

where n ranges from 0 to M−1 (8 total states comprising the unrotated state of the constellation and 7 rotated states).

Columns: increasing $n \to C_{\alpha,n} =$ (2)

$$\begin{bmatrix} r_A e^{j\theta_A} e^{j0} & r_A e^{j\theta_A} e^{-j2\pi\frac{1}{8}} & \cdots & r_A e^{j\theta_A} e^{-j2\pi\frac{7}{8}} \\ r_B e^{j\theta_B} e^{j0} & r_B e^{j\theta_B} e^{-j2\pi\frac{1}{8}} & \cdots & r_B e^{j\theta_B} e^{-j2\pi\frac{7}{8}} \\ \vdots & \vdots & \ddots & \vdots \\ r_P e^{j\theta_P} e^{j0} & r_P e^{j\theta_P} e^{-j2\pi\frac{1}{8}} & \cdots & r_P e^{j\theta_P} e^{-j2\pi\frac{7}{8}} \end{bmatrix}$$

The complex numeric values corresponding to the unrotated constellation (n=0), comprising the first column of the table of stored values, shall be referred to hereinafter as the "base constellation," and each remaining column of the table above shall be referred to as the "$n^{th}$ rotated constellation". The more general form for the table of stored values is shown in equation (3), for the general case of k-bit code words with $2^k$ possible numeric values and an M-point DFT.

$$C_{\alpha,n} = \begin{bmatrix} r_{[1]} e^{j\theta_{[1]}} e^{j0} & r_{[1]} e^{j\theta_{[1]}} e^{-j2\pi\frac{1}{M}} & \cdots & r_{[1]} e^{j\theta_{[1]}} e^{-j2\pi\frac{M-1}{M}} \\ r_{[2]} e^{j\theta_{[2]}} e^{j0} & r_{[2]} e^{j\theta_{[2]}} e^{-j2\pi\frac{1}{M}} & \cdots & r_{[2]} e^{j\theta_{[2]}} e^{-j2\pi\frac{M-1}{M}} \\ \vdots & \vdots & \ddots & \vdots \\ r_{[2^k]} e^{j\theta_{[2^k]}} e^{j0} & r_{[2^k]} e^{j\theta_{[2^k]}} e^{-j2\pi\frac{1}{M}} & \cdots & r_{[2^k]} e^{j\theta_{[2^k]}} e^{-j2\pi\frac{M-1}{M}} \end{bmatrix}$$ (3)

Note that for most constellations, there is some degree of rotational symmetry. For QAM constellations, there is fourfold rotational symmetry, so the number of unique column values in the lookup tables for an M-point precoding transform is M/4, and it would therefore be possible to reduce the size of the lookup table by reusing duplicate values.

An even more general representation for a generalized M-Point PCPT is shown in equation (4). The $\varphi_m$ values are the phase factors characteristic of the particular PCPT implementation.

$$C_{\alpha,n} = \begin{bmatrix} r_{[1]} e^{j\theta_{[1]}} e^{j\varphi_0} & r_{[1]} e^{j\theta_{[1]}} e^{j\varphi_1} & \cdots & r_{[1]} e^{j\theta_{[1]}} e^{j\varphi_{M-1}} \\ r_{[2]} e^{j\theta_{[2]}} e^{j\varphi_0} & r_{[2]} e^{j\theta_{[2]}} e^{j\varphi_1} & \cdots & r_{[2]} e^{j\theta_{[2]}} e^{j\varphi_{M-1}} \\ \vdots & \vdots & \ddots & \vdots \\ r_{[2^k]} e^{j\theta_{[2^k]}} e^{j\varphi_0} & r_{[2^k]} e^{j\theta_{[2^k]}} e^{j\varphi_1} & \cdots & r_{[2^k]} e^{j\theta_{[2^k]}} e^{j\varphi_{M-1}} \end{bmatrix}$$ (4)

As discussed above with respect to FIG. 4, there are two different mapping steps in the full precoded OFDM system, the mapping of symbol code words to the input of the PCPT, and the mapping of the output of the PCPT to the IFFT input. These are referred to as "Layer Mapping" and "Resource Element Mapping", respectively, in O-RAN terminology. However, it should be understood that this mapping functionality described for O-RAN would be required for any precoded OFDMA system. Thus, the use of the terms "Layer Mapping" and "Resource Element Mapping" herein is not intended to limit application of the present invention to O-RAN systems.

Figure 7A:
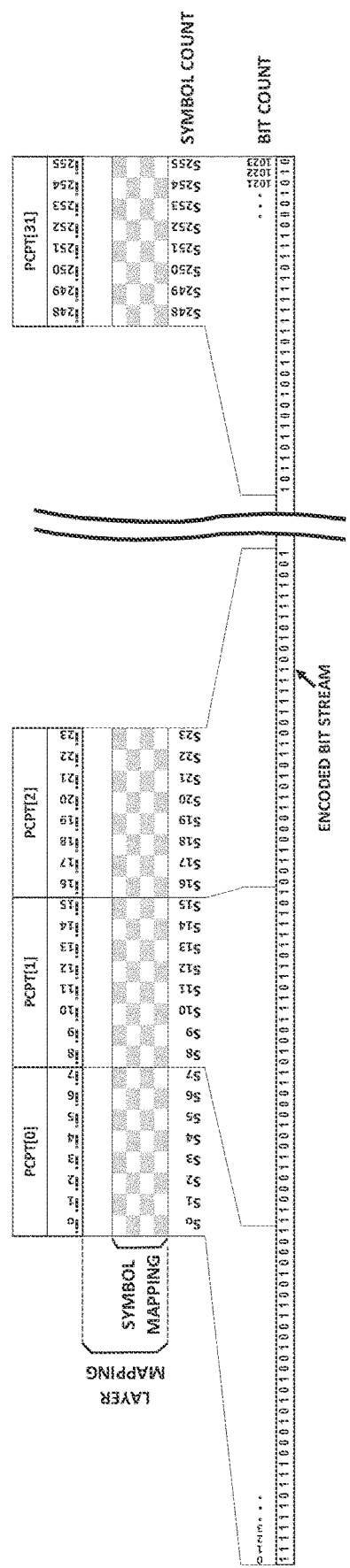
FIG. 7a is an illustrative diagram showing an encoded string of 1024 bits (derived from the user data stream) along the bottom row, above which is shown a four-row by 256-column register into which the 1024 bits can be arbitrarily mapped, which in turn serves as input to thirty-two phase cyclic precoding transform (PCPT) operations.

FIG. 7a illustrates the Layer Mapping for the M=8, N=256 case described earlier, showing at the bottom a row of the 1024 encoded data bits that serve as input for one symbol period, and above that, a diagram of register that holds 256 4-bit code words. This mapping is, in principle, arbitrary. In fact, one could work with a string of encoded bits even larger than 1024 and cross-map onto multiple symbols. For simplicity, we will here restrict considerations to mapping of N×k bit strings (1024 in this case) onto the inputs for a single symbol period. Further, although the assignment of the 1024-bits to 256 4-bit symbol code words can also be arbitrary, we will here for simplicity consider only the case in which the 1024 bits are sequentially segmented into 4-bit symbol code words. This is illustrated in FIG. 7b.

Figure 7B:
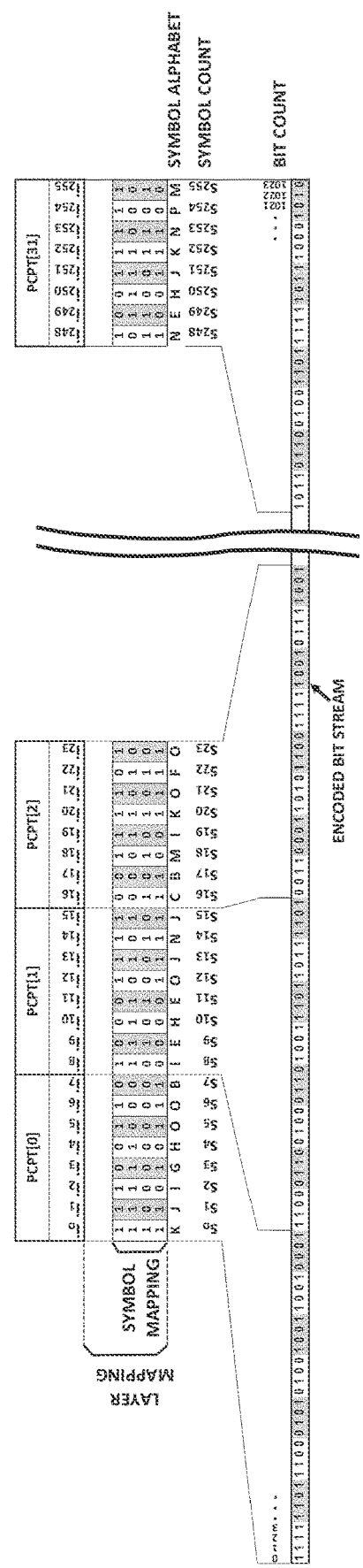
FIG. 7b is an illustrative diagram showing the encoded data string shown in FIG. 7a serially segmented into 4-bit symbol code words, above which is shown a four-row by 256-column into which the code words are serially mapped.
Figures 8A, 8B:
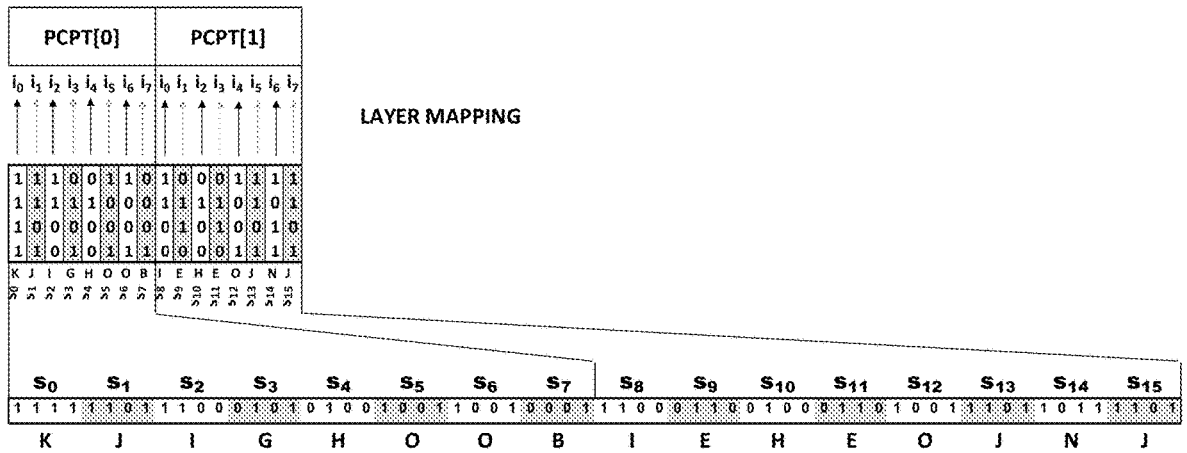
FIG. 8a is an expanded view of the first 16 columns of the buffer illustrated in FIG. 7b, illustrating a straightforward, sequential Layer Mapping of code words to PCPT input.
FIG. 8*b* is an illustrative diagram showing an alternative Layer Mapping in which the code words are mapped to the PCPT inputs in a non-sequential fashion.

FIG. 8a shows an enlarged segment of FIG. 7b (the first 2 PCPT inputs), and shows the most straightforward Layer Mapping operation, in which the sequentially segmented code words are mapped in sequence to the PCPT inputs. This Layer Mapping of the symbol code words onto the PCPT inputs is, again, arbitrary. One reason to consider an alternative option to the straightforward, sequential mapping is to mitigate multipath effects. By mapping time-adjacent symbols onto inputs of different PCPTs, these time-adjacent symbols are transmitted at separated frequencies so that they are unlikely to simultaneously be impacted by multipath-induced nulls, which improves the efficacy of error-correcting algorithms. This type of improved Layer Mapping is shown in FIG. 8b. Another reason to use a non-sequential mapping is to scramble data for reasons of obfuscation. The inverse mapping must be used at the receiver to recover the data, and even with only eight-input PCPT points, there are over 40,000 permutations.

As is understood, there is a second mapping between the outputs of the PCPT and the inputs of the IFFT. In the O-RAN standard, this is referred to as Resource Element Mapping. While we will use this O-RAN terminology, it is to be understood that even in non-O-RAN precoded OFDMA systems as in digital satellite systems, the equivalent functionality is required. Generally, outputs of the PCPTs are mapped as blocks onto contiguous ranges of inputs to the IFFT. These are known as Resource Blocks. As seen, Resource Element Mapping can be decomposed into two distinct operations: Resource Block Mapping and Intra-block Mapping.

Figure 9A:
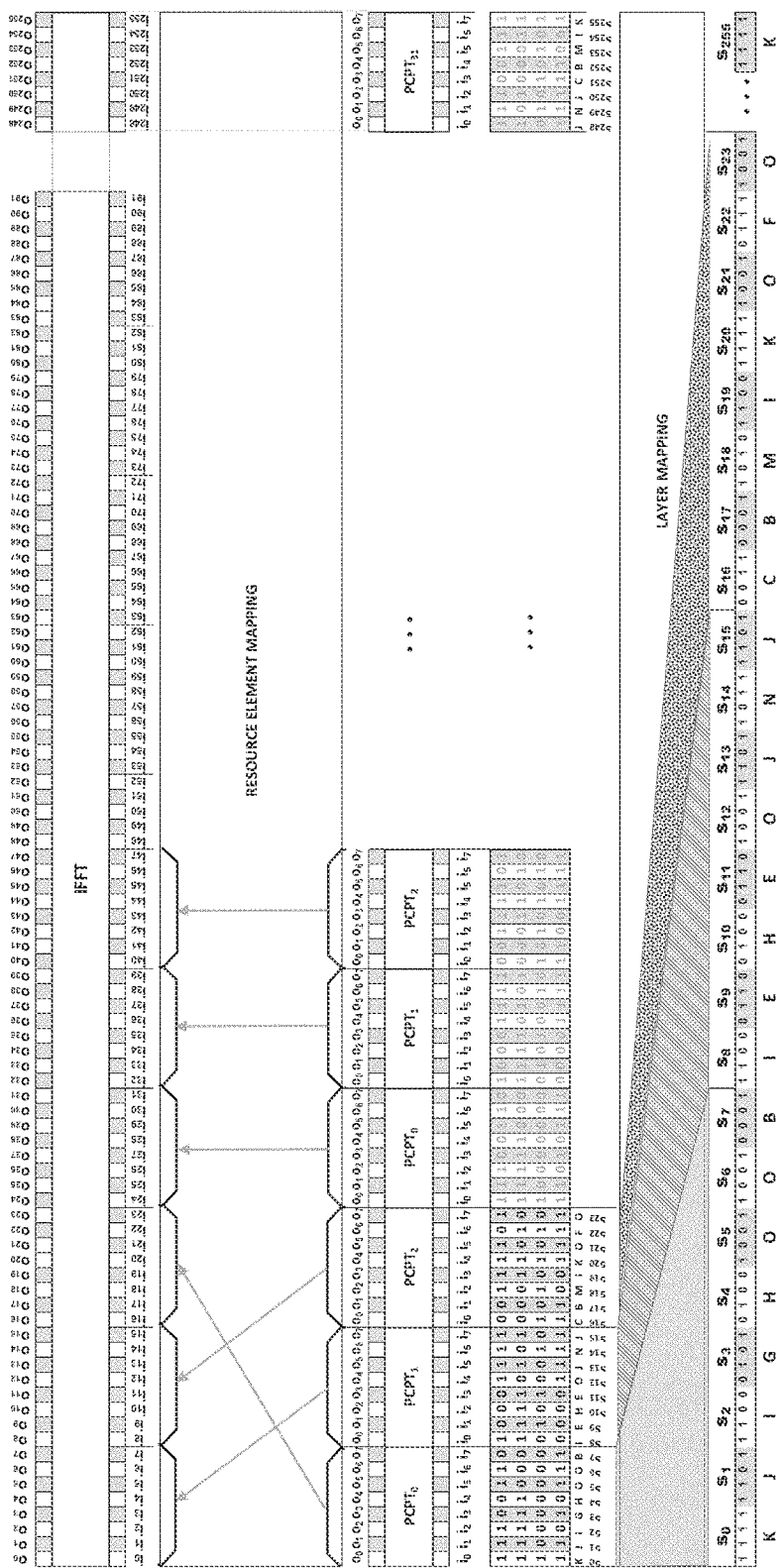
FIG. 9*a* is an illustrative diagram showing Resource Block Mapping of individual PCPT outputs to contiguous blocks of IFFT inputs.
Figure 9B:
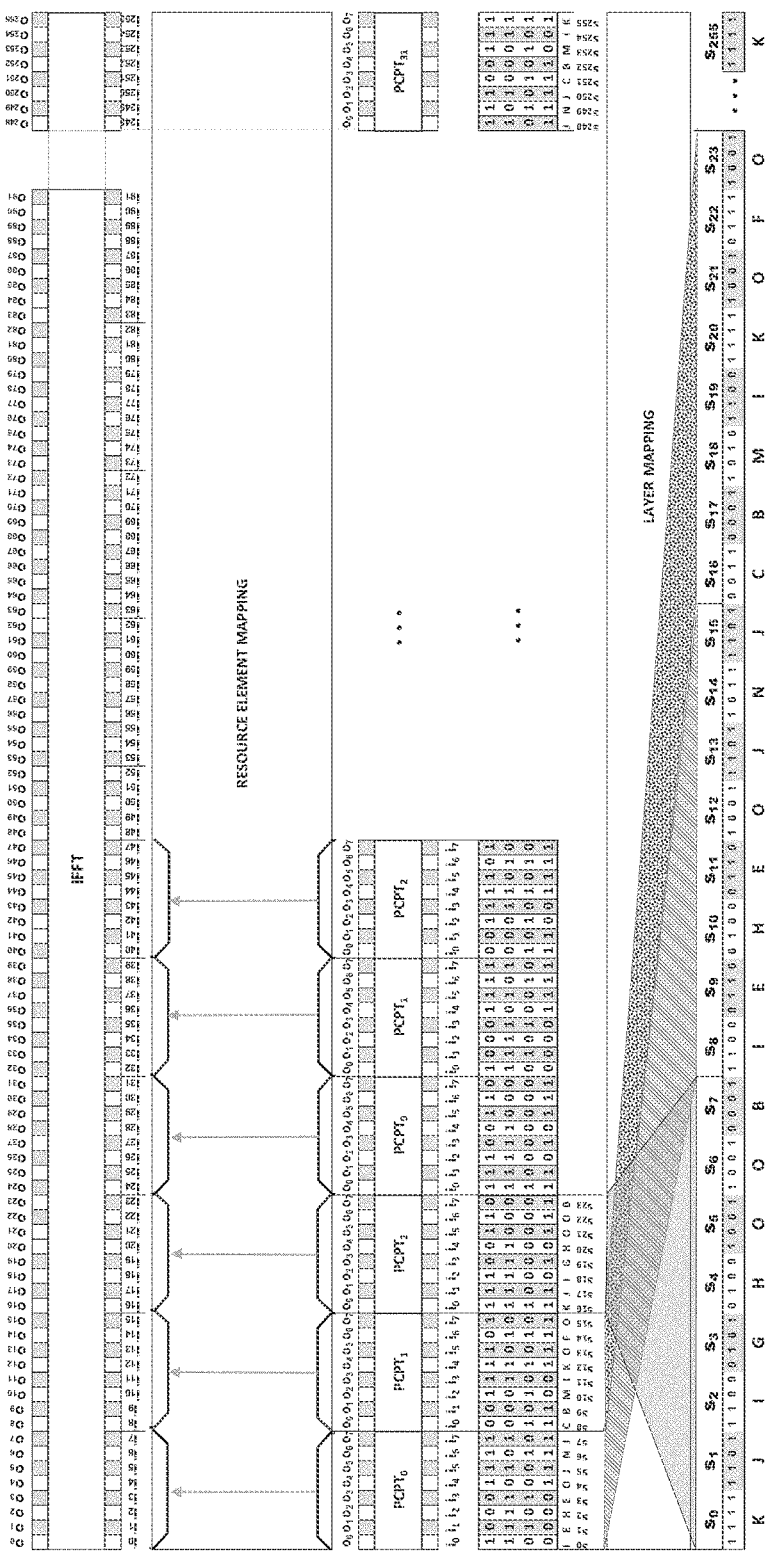
FIG. 9*b* illustrates that the Resource Block Mapping shown in FIG. 9B can be equivalently accomplished at the Layer Mapping step, allowing the use of straightforward, sequential Resource Block Mapping from PCPT outputs to IFFT inputs.

In mobile telephony, Resource Element Mapping is used to assign data to available frequency-time slots (known as Resource Elements in the O-RAN standard). These mappings are made dynamically to make effective use of the individual time increments (symbol periods) and subcarrier frequency allocations. These mappings can also be used to obfuscate signals by scrambling the mapping in a manner known only to specific transmitting and receiving parties. FIG. 9a illustrates an exemplary Resource Block mapping. FIG. 9b illustrates that the Resource Block Mapping shown in FIG. 9a can optionally be implemented at the first mapping.

Figure 10A:
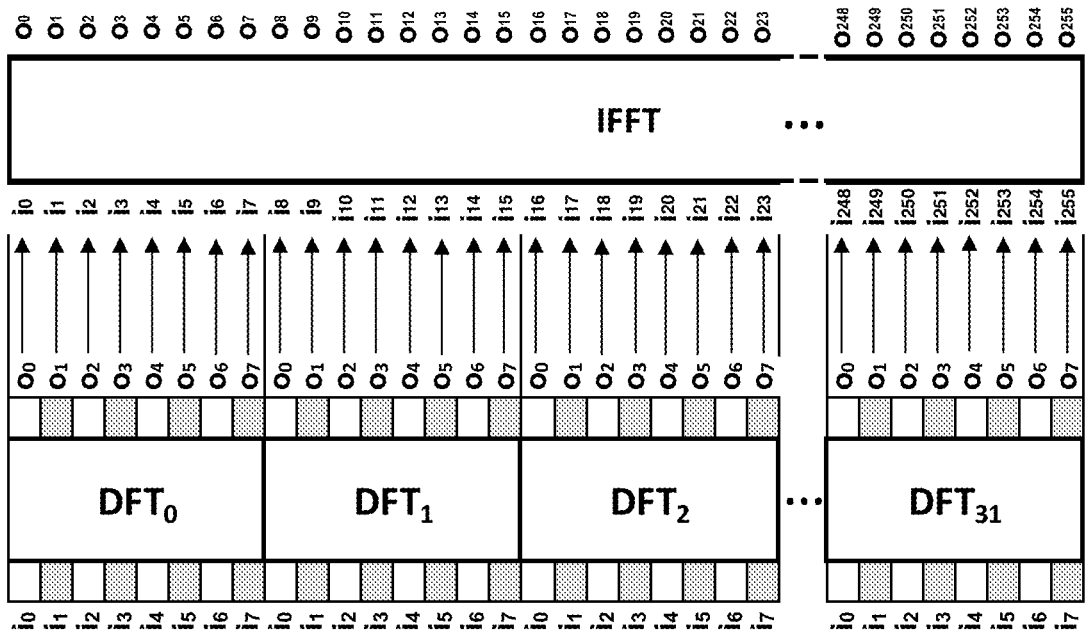
FIG. 10*a* shows straightforward, sequential intra-block mapping from the PCPT outputs to the corresponding IFFT block inputs.
Figure 10B:
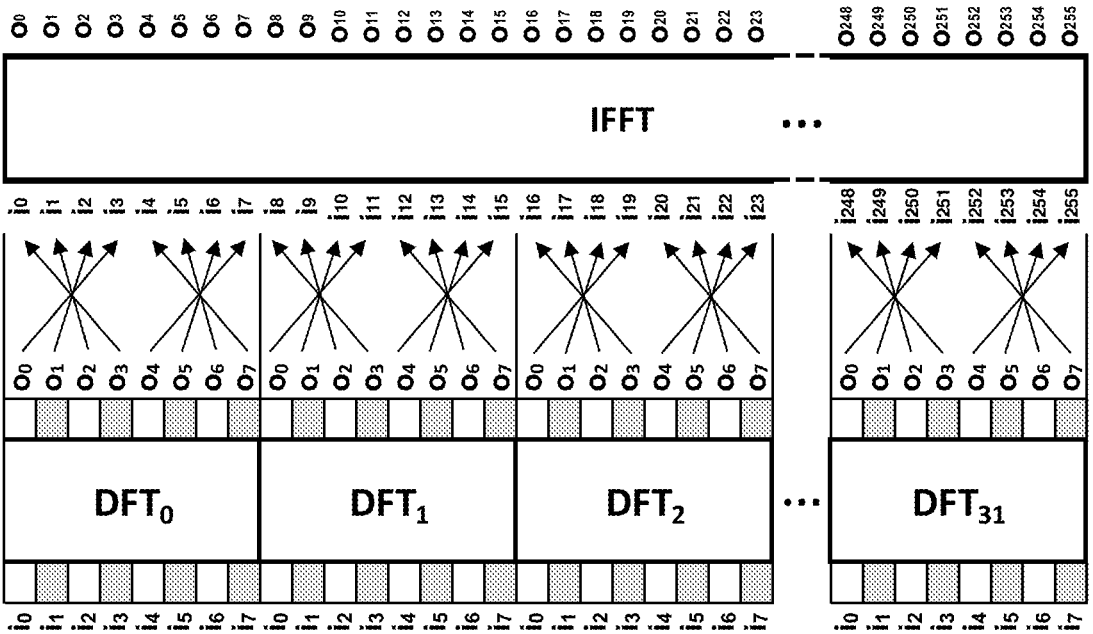
FIG. 10*b* shows an alternative mapping to FIG. 10A with "scrambled" intra-block mapping.

Within the blocks, the most straightforward Intra-block assignment of PCPT outputs to IFFT inputs would be sequential, as illustrated in FIG. 10a. The assignment of the PCPT outputs to the corresponding range of IFFT inputs need not be sequential, however. Non-sequential intra-block mapping can primarily serve as scrambling for purposes of signal obfuscation. An exemplary non-sequential mapping is shown in FIG. 10b. With an 8-point PCPT, there are over forty thousand such non-sequential mappings.

Figure 11:
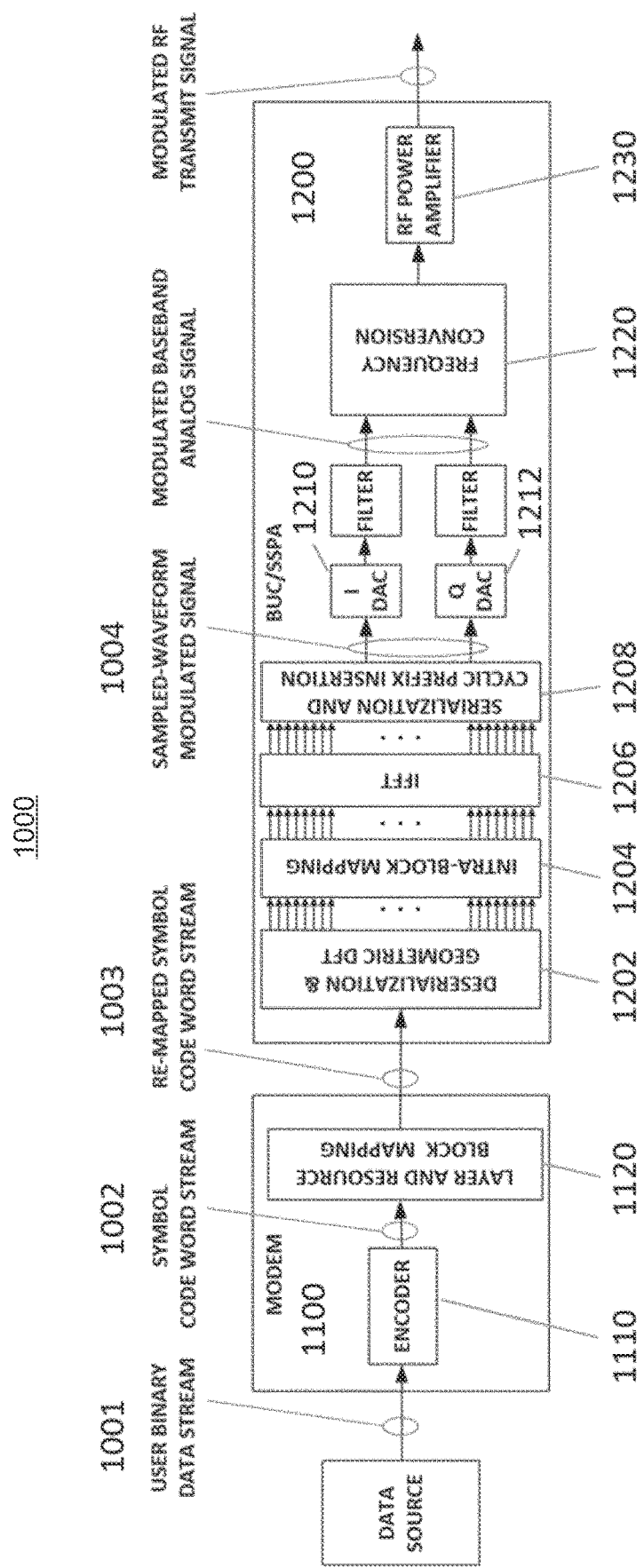
FIG. 11 is block diagram showing one preferred implementation of DFT-s-OFDMA or SC-FDMA system of the present invention using symbol code word transport and geometric DFT, with DFT input mapping (Layer Mapping and Resource Block Mapping) functions partitioned with the encoder in the central unit.

Putting this all together, one preferred implementation of the present "geometric DFT shift" invention is illustrated in block diagram 1000 of FIG. 11, showing a simplified central unit CU, or modem, 1100 and remote unit (RU) or BUC/SSPA 1200, as may be implemented in a digital satellite system. The following functions are in CU 1100. Encoder 1110 applies error correction bits and any headers, trailers, or other auxiliary bits to user's binary data bit stream 1001. The stream is segmented into k-bit symbol code words as stream 1002. Blocks of M symbol words are mapped onto M-point blocks for input to the DFT 1120 (for the Layer Mapping operation). The (N÷M) M-word blocks of mapped symbols are mapped onto the (N÷M) M-word IFFT input segments (Resource Block Mapping). This re-mapped code word stream 1003 is now transported as symbol code words from CU 1100 to RU (BUC) 1200, without concern of bad actors intercepting and understanding the scrambled transported information.

Upon arrival at RU 1200, each M-word block in the transmission is subjected to the inventive "geometric transform" operation in block 1202 as previously described. Because of the Resource Block "pre-scrambling" of the M-word blocks, the outputs of the geometric transforms can be sequentially applied to the inputs of IFFT 1206 via intra-block mapping block 1204.

At block 1208, the output of IFFT 1206 is serialized, and a cyclic prefix is added. And pulse shaping filtering is applied, if necessary, to form the sampled digital version 1004 of the baseband signal for transmission. This signal is then converted to analog by I DAC and Q DAC blocks 1210, 1212, upconverted at block 1220 to the transmission frequency, amplified by RF power amplifier 1230, and then transmitted via an antenna. Note that in some applications, it may be preferable to perform a numerical upconversion to an intermediate frequency prior to the digital-to-analog conversion, and the illustrated example is not intended to restrict this or other implementations.

The method described herein provides two separate advantages over the conventional methods: (1) a reduction in the data rate of the signal transported between modem and RF equipment, and (2) a reduction in the computational load in the evaluation of the precoding of the signal. The data is transported in symbol alphabet format rather than sampled-waveform format, which provides a significant reduction in the data rate on the digital connection between the modem and RF equipment, up to a factor of ten or more. The Layer Mapping is implemented at the CU, and the Resource Block Mapping is implemented at the CU through the ordering of the symbol code word sub-blocks in the symbol stream. Intra-block mapping would be implemented at the RU.

With the geometric DFT of the present invention, the evaluation of the phase-cyclic precoding is reduced from the calculation of an M-point DFT to $M^2$ table lookups and M complex additions—eliminating the need for complex multiplications altogether. It is understood that implementations for this method other than that shown in FIG. 11 is within the scope of the present invention.

While embodiments of the invention have been illustrated and described, it is not intended that these embodiments illustrate and describe all possible forms of the invention. Various changes, modifications, and alterations in the teachings of the present invention may be contemplated by those skilled in the art without departing from the intended spirit and scope thereof. It is intended that the present invention encompass such changes and modifications.

What is claimed is:

1. A method for implementing an M-point phase-cyclic transform used for precoding in a pre-coded orthogonal frequency-division multiplexing (OFDM) system, on a digital signal stream represented as a sequence of M k-bit symbol code words, wherein M is a number of code words and k is a number of bits in a code word, each code word representing one of $2^k$ points in a base constellation of points on the complex plane, the method comprising:

a. generating a geometric shift table of stored values, having $2^k$ rows and M columns, the geometric shift table defined by $$C_{\alpha,n} = \begin{bmatrix} r_{[1]}e^{j\theta[1]}e^{j\varphi_0} & r_{[1]}e^{j\theta[1]}e^{j\varphi_1} & \cdots & r_{[1]}e^{j\theta[1]}e^{j\varphi_{M-1}} \\ r_{[2]}e^{j\theta[2]}e^{j\varphi_0} & r_{[2]}e^{j\theta[2]}e^{j\varphi_1} & \cdots & r_{[2]}e^{j\theta[2]}e^{j\varphi_{M-1}} \\ \vdots & \vdots & \ddots & \vdots \\ r_{[2^k]}e^{j\theta[2^k]}e^{j\varphi_0} & r_{[2^k]}e^{j\theta[2^k]}e^{j\varphi_1} & \cdots & r_{[2^k]}e^{j\theta[2^k]}e^{j\varphi_{M-1}} \end{bmatrix}$$

wherein each column is referenced by an index, n, and each of row is referenced by one of the $2^k$ k-bit symbol code words, with n ranging from 0 for the first column to n=M−1 for the $M^{th}$ column, and the $\varphi_m$ exponents represent the phase factors characteristic of the phase-cyclic transform to be implemented and wherein entries in the first column contain the complex numeric values from $r_{[1]}e^{j\theta[1]}$ to $r_{[2^k]}e^{j\theta[2^k]}$ corresponding to each point in the base constellation, ordered by the corresponding code word, and each subsequent column containing entries equaling the complex numeric value of each point in the base constellation multiplied by the corresponding phase factors, $\varphi_n$, that characterize said phase-cyclic transform, with each row entry ordered by the corresponding code word;

b. mapping each of the M symbol code words within said sequence of M k-bit symbol code words to an index, m, with m ranging from 0 to M−1;

c. forming a set of M outputs of the transform, referenced by an index, l, with l ranging from 0 to M−1; and d. evaluating each of said M outputs of the set of M outputs as a sum of M table entries, each said entry selected from the $n^{th}$ column of the geometric shift table where n is evaluated as a product of l and m, modulo M, and from the row corresponding to the code word assigned to the $m^{th}$ index, m ranging from 0 to M−1.

2. The method of claim 1, where the phase-cyclic transform is a Discrete Fourier Transform, and the phase factors, $\varphi_n$, are $-2\pi n/M$.

3. The method of claim 1, further comprising the steps of performing a Layer Mapping operation and a Resource Block Mapping operation on the sequence of M k-bit symbol code words at a first location, and wherein the forming and evaluating steps are called Geometric Shift Precoding and performed at a location remote from the first location.

4. The method of claim 3, wherein the transform is implemented in a wireless transmission system for transmitting a wireless signal over air, the Layer Mapping and Resource Block Mapping operations are performed in a modem at the first location and the Geometric Shift Precoding and preparation of the wireless signal for transmission via an air interface are performed at the remote location.

5. A method for transporting a digital signal stream within a pre-coded orthogonal frequency-division multiplexing (OFDM) transmission system, the method comprising:

a. encoding in a modem the digital signal stream as a sequence of M k-bit symbol code words, wherein M is a number of code words and k is a number of bits in a code word, each code word representing one of $2^k$ points in a base constellation of points on the complex plane; and b. transporting from the modem the sequence of M k-bit symbol code words to a remote unit;

wherein, at the remote unit, the sequence of M k-bit symbol code words is input into an M-point phase-cyclic precoding transform implemented by i. generating a geometric shift table of stored values, having $2^k$ rows and M columns, the geometric shift table defined by $$C_{\alpha,n} = \begin{bmatrix} r_{[1]}e^{j\theta_{[1]}}e^{j\varphi_0} & r_{[1]}e^{j\theta_{[1]}}e^{j\varphi_1} & \cdots & r_{[1]}e^{j\theta_{[1]}}e^{j\varphi_{M-1}} \\ r_{[2]}e^{j\theta_{[2]}}e^{j\varphi_0} & r_{[2]}e^{j\theta_{[2]}}e^{j\varphi_1} & \cdots & r_{[2]}e^{j\theta_{[2]}}e^{j\varphi_{M-1}} \\ \vdots & \vdots & \ddots & \vdots \\ r_{[2^k]}e^{j\theta_{[2^k]}}e^{j\varphi_0} & r_{[2^k]}e^{j\theta_{[2^k]}}e^{j\varphi_1} & \cdots & r_{[2^k]}e^{j\theta_{[2^k]}}e^{j\varphi_{M-1}} \end{bmatrix}$$

wherein each column is referenced by an index, n, and each of row is referenced by one of the $2^k$ k-bit symbol code words, with n ranging from 0 for the first column to n=M−1 for the $M^{th}$ column, and the $\varphi_m$ exponents represent the phase factors characteristic of the phase-cyclic precoding transform to be applied, and wherein entries in the first column contain the complex numeric values from $r_{[1]}e^{j\theta_{[1]}}$ to $r_{[2^k]}e^{j\theta_{[2^k]}}$ corresponding to each point in the base constellation, ordered by the corresponding code word, and each subsequent column containing entries equaling the complex numeric value of each point in the base constellation multiplied by the corresponding phase factors, $\varphi_n$, that characterize said phase-cyclic precoding transform, with each row entry ordered by the corresponding code word;

ii. mapping each of the M symbol code words within said sequence of M k-bit symbol code words to an index, m, with m ranging from 0 to M−1;

iii. forming a set of M outputs of the transform, referenced by an index, l, with l ranging from 0 to M−1; and iv. evaluating each of said M outputs of the set of M outputs as a sum of M table entries, each said entry selected from the $n^{th}$ column of the table where n is evaluated as a product of l and m, modulo M, and from the row corresponding to the code word assigned to the $m^{th}$ index, m ranging from 0 to M−1.

6. A non-transitory computer-readable storage medium storing one or more computer-readable programs which, when executed on a processor, configure the processor to carry out a method for computationally performing an M-point phase-cyclic transform used for precoding in a pre-coded orthogonal frequency-division multiplexing (OFDM) system, on a digital signal stream represented as a sequence of M k-bit symbol code words, wherein M is a number of code words and k is a number of bits in a code word, each code word representing one of $2^k$ points in a base constellation of points on the complex plane, the method comprising:

a. generating a geometric shift table of stored values, having $2^k$ rows and M columns, the geometric shift table defined by $$C_{\alpha,n} = \begin{bmatrix} r_{[1]}e^{j\theta_{[1]}}e^{j\varphi_0} & r_{[1]}e^{j\theta_{[1]}}e^{j\varphi_1} & \cdots & r_{[1]}e^{j\theta_{[1]}}e^{j\varphi_{M-1}} \\ r_{[2]}e^{j\theta_{[2]}}e^{j\varphi_0} & r_{[2]}e^{j\theta_{[2]}}e^{j\varphi_1} & \cdots & r_{[2]}e^{j\theta_{[2]}}e^{j\varphi_{M-1}} \\ \vdots & \vdots & \ddots & \vdots \\ r_{[2^k]}e^{j\theta_{[2^k]}}e^{j\varphi_0} & r_{[2^k]}e^{j\theta_{[2^k]}}e^{j\varphi_1} & \cdots & r_{[2^k]}e^{j\theta_{[2^k]}}e^{j\varphi_{M-1}} \end{bmatrix}$$

wherein each column is referenced by an index, n, and each of row is referenced by one of the $2^k$ k-bit symbol code words, with n ranging from 0 for the first column to n=M−1 for the $M^{th}$ column, and the $\varphi_m$ exponents represent the phase factors characteristic of the phase-cyclic transform to be applied, and wherein entries in the first column contain the complex numeric values from $r_{[1]}e^{j\theta_{[1]}}$ to $r_{[2^k]}e^{j\theta_{[2^k]}}$ corresponding to each point in the base constellation, ordered by the corresponding code word, and each subsequent column containing entries equaling the complex numeric value of each point in the base constellation multiplied by the corresponding phase factors, $\varphi_n$, that characterize said phase-cyclic transform, with each row entry ordered by the corresponding code word;

b. mapping each of the M symbol code words within said sequence of M k-bit symbol code words to an index, m, with m ranging from 0 to M−1;

c. forming a set of M outputs of the transform, referenced by an index, l, with l ranging from 0 to M−1; and d. evaluating each of said M outputs of the set of M outputs as a sum of M table entries, each said entry selected from the $n^{th}$ column of the table where n is evaluated as a product of l and m, modulo M, and from the row corresponding to the code word assigned to the $m^{th}$ index, m ranging from 0 to M−1.

* * * * *